United States Patent
Dipol et al.

(10) Patent No.: US 9,928,111 B2
(45) Date of Patent: *Mar. 27, 2018

(54) SYSTEM AND METHOD FOR CONFIGURATION TAGGING IN A MULTITENANT APPLICATION SERVER ENVIRONMENT

(71) Applicant: ORACLE INTERNATIONAL CORPORATION, Redwood Shores, CA (US)

(72) Inventors: Joseph Dipol, Sunnyvale, CA (US); Martin Mares, Prague (CZ); Nazrul Islam, Santa Clara, CA (US); Romain Grecourt, Prague (CZ); Jennifer Galloway, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,146

(22) Filed: Jun. 23, 2015

(65) Prior Publication Data
US 2015/0373099 A1     Dec. 24, 2015

Related U.S. Application Data

(60) Provisional application No. 62/016,043, filed on Jun. 23, 2014, provisional application No. 62/054,907, filed on Sep. 24, 2014.

(51) Int. Cl.
*G06F 15/16*     (2006.01)
*G06F 9/50*     (2006.01)
(Continued)

(52) U.S. Cl.
CPC .......... *G06F 9/5077* (2013.01); *H04L 47/783* (2013.01); *H04L 67/1025* (2013.01); *H04L 67/42* (2013.01)

(58) Field of Classification Search
None
See application file for complete search history.

(56) References Cited

U.S. PATENT DOCUMENTS 6,247,109 B1     6/2001 Kleinsorge et al.
6,542,926 B2     4/2003 Zalewski et al.
(Continued)

OTHER PUBLICATIONS

Office Action issued by United States Patent and Trademark Office for U.S. Appl. No. 14/748,142, dated Jul. 5, 2016, 12 pages.
(Continued)

*Primary Examiner* — Padma Mundur
(74) *Attorney, Agent, or Firm* — Tucker Ellis LLP

(57) ABSTRACT

In accordance with an embodiment, described herein is a system and method for supporting the use of configuration tagging in a multitenant application server environment. In accordance with an embodiment, a user interface is provided which displays a domain structure, including partitions and target systems, and enables components of the domain to be associated with user-specified tags that are received from an administrator, including for example, a first component associated with a first set of one or more tag(s), and a second component associated with a second set of one or more tag(s), which are then associated with the corresponding domain component. For example, a virtual target or target system can be associated with a tag such as "Gold", "Silver" or "Bronze". The tagged components can then be associated with the creation or definition of a partition.

17 Claims, 8 Drawing Sheets

(51) Int. Cl.
*H04L 12/911* (2013.01)
*H04L 29/08* (2006.01)
*H04L 29/06* (2006.01)

(56) References Cited

U.S. PATENT DOCUMENTS

| | | | |
|---|---|---|---|
| 6,980,980 B1 | 12/2005 | Yeh | |
| 7,590,984 B2 | 9/2009 | Kaufman et al. | |
| 7,725,559 B2 | 5/2010 | Landis et al. | |
| 7,926,060 B2 | 4/2011 | Klingman | |
| 8,234,650 B1 | 7/2012 | Eppstein et al. | |
| 8,458,717 B1 | 6/2013 | Keagy et al. | |
| 8,495,067 B2 | 7/2013 | Ripberger | |
| 8,656,386 B1 | 2/2014 | Baimetov et al. | |
| 8,671,404 B2 | 3/2014 | DeHaan et al. | |
| 8,898,668 B1 | 11/2014 | Costea et al. | |
| 8,959,523 B2 | 2/2015 | Patil et al. | |
| 2012/0150912 A1* | 6/2012 | Ripberger | G06F 21/80 707/786 |
| 2013/0212576 A1* | 8/2013 | Huang | G06F 9/45558 718/1 |
| 2013/0232498 A1* | 9/2013 | Mangtani | G06F 9/5072 718/104 |

OTHER PUBLICATIONS

Tatsubori et al., "HTML Templates that Fly", ACM, pp. 951-960, 2009, 10 pages.
Sorenson et al., "Reuse and Combination with Package Templates", ACM, pp. 1-5, 2010, 5 pages.
Porter et al., "Partition Configuration for Real-Time Systems With Dependencies", ACM, pp. 87-96, 2013.
Barreiros et al., "A Cover-Based Approach for Configuration Repair", ACM, pp. 157-167, 2014.
Leibert et al., "Automatic Management of Partitioned, Replicated Search Services", ACM, pp. 1-8, 2011.
Ambrosio et al., "Configuration Level Hardware/Software Partitioning for Real Time Embedded Systems", IEEE, pp. 34-41, 1994.
United States Patent and Trademark Office, Notice of Allowance Dated Mar. 1, 2017 for U.S. Appl. No. 14/748,142, 21 Pages.
Wicinas, Dave, "Setting up and using PaaS provisioning", Jun. 24, 2014, retrieved from https://docs.bmc.com/docs/display/public/clm41/Setting+up+and+using+PaaS+provisioning; sessionid=B59567DCE44F150CDFB42C0ECB114D47#Settingupandusing-PaaSprovisioning-EstablishingaPaaSpolicy on Apr. 22, 2015, 18 pages.
Rai, Abhishek, "Trending in Support: How Tagging works in BMC Cloud Lifecycle Management (CLM) 3.1?", Oct. 7, 2013, retrieved from https://communities.bmc.com/community/bmcdn/cloud_lifecycle_management/blog/2013/10/07/the-pulse-how-tagging-works-in-bmc-cloud-lifecycle-management-clm-31 on Apr. 22, 2015, 7 pages.
"Bare-Metal Provisioning with Razor", retrieved from https://docs.puppetlabs.com/pe/latest/razor_intro.html#razor-identifies-a-new-node on Apr. 22, 2015, 14 pages.
"Tagging Your Amazon EC2 Resources", captured from http://docs.aws.amazon.com/AWSEC2/latest/UserGuide/Using_Tags.html#tag-resources-for-billing; by Internet Archive Wayback Machine at https://web.archive.org/web/20150409075025/http://docs.aws.amazon.com/AWSEC2/latest/UserGuide/Using_Tags_html; on Apr. 9, 2015, 3 pages.
"Placement Profile—Best Fit Cluster using Tags", Sep. 6, 2013, retrieved from http://cloudformsnow.com/2013/09/06/placement-profile-best-fit-cluster-using-tags/ on Apr. 22, 2015, 5 pages.

* cited by examiner

SYSTEM AND METHOD FOR CONFIGURATION TAGGING IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional application titled "SYSTEM AND METHOD FOR PARTITION TEMPLATES AND TIERED PARTITIONS IN A MULTITENANT APPLICATION SERVER ENVIRONMENT", Application No. 62/016,043, filed Jun. 23, 2014; and U.S. Provisional application titled "SYSTEM AND METHOD FOR PARTITION TEMPLATES AND CONFIGURATION TAGGING IN A MULTITENANT APPLICATION SERVER ENVIRONMENT", Application No. 62/054,907, filed Sep. 24, 2014; and is related to U.S. patent application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting use of partition templates and configuration tagging in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for supporting the use of configuration tagging in a multitenant application server environment. In accordance with an embodiment, a user interface is provided which displays a domain structure, including partitions and target systems, and enables components of the domain to be associated with user-specified tags that are received from an administrator, including for example, a first component associated with a first set of one or more tag(s), and a second component associated with a second set of one or more tag(s), which are then associated with the corresponding domain component. For example, a virtual target or target system can be associated with a tag such as "Gold", "Silver" or "Bronze". The tagged components can then be associated with the creation or definition of a partition.

DETAILED DESCRIPTION

In accordance with an embodiment, described herein is a system and method for supporting the use of configuration tagging in a multitenant application server environment. In accordance with an embodiment, a user interface is provided which displays a domain structure, including partitions and target systems, and enables components of the domain to be associated with user-specified tags that are received from an administrator, including for example, a first component associated with a first set of one or more tag(s), and a second component associated with a second set of one or more tag(s), which are then associated with the corresponding domain component. For example, a virtual target or target system can be associated with a tag such as "Gold", "Silver" or "Bronze". The tagged components can then be associated with the creation or definition of a partition.

Application Server (e.g., Multi-Tenant, MT) Environment

Figure 1:
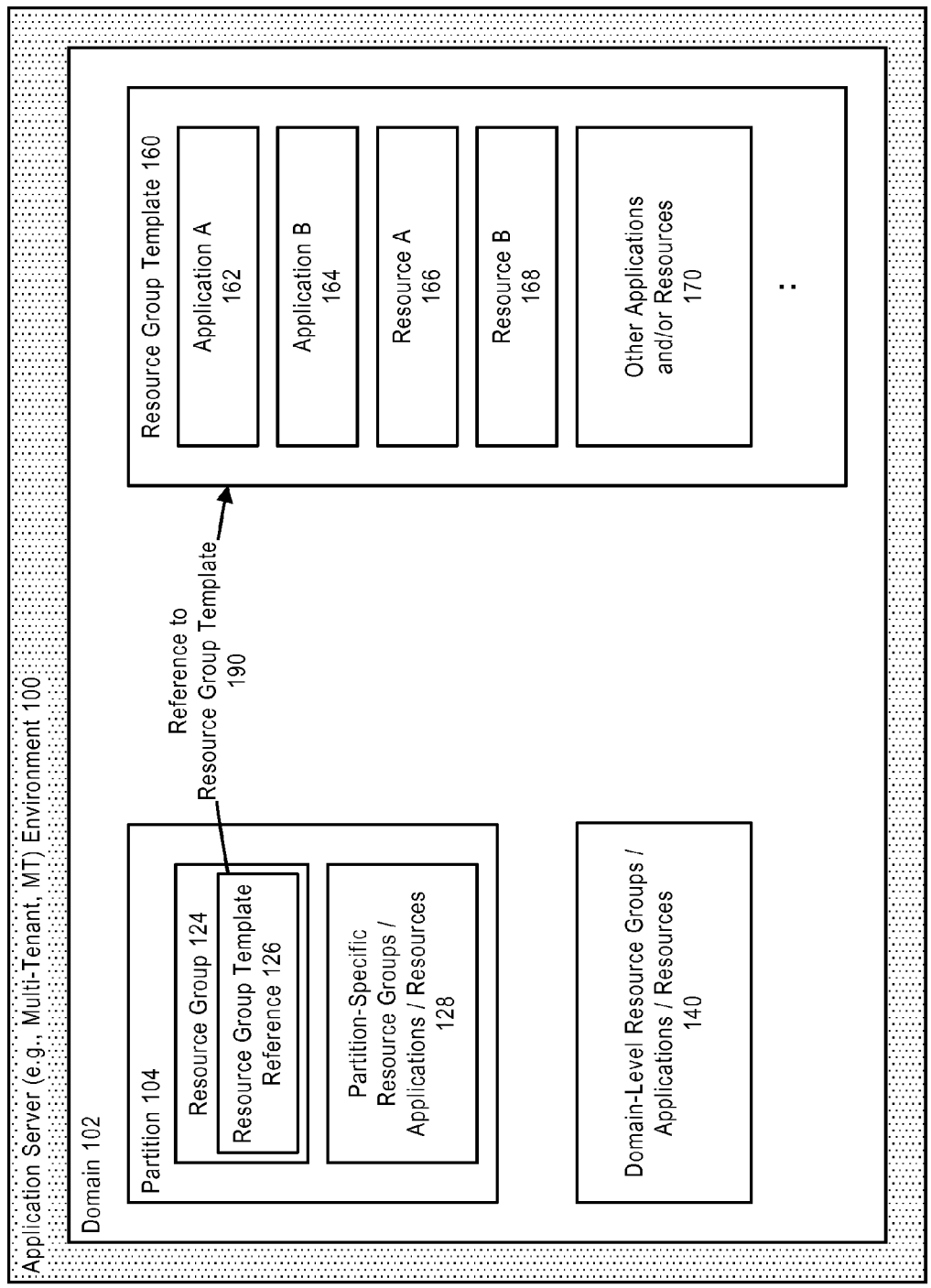
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
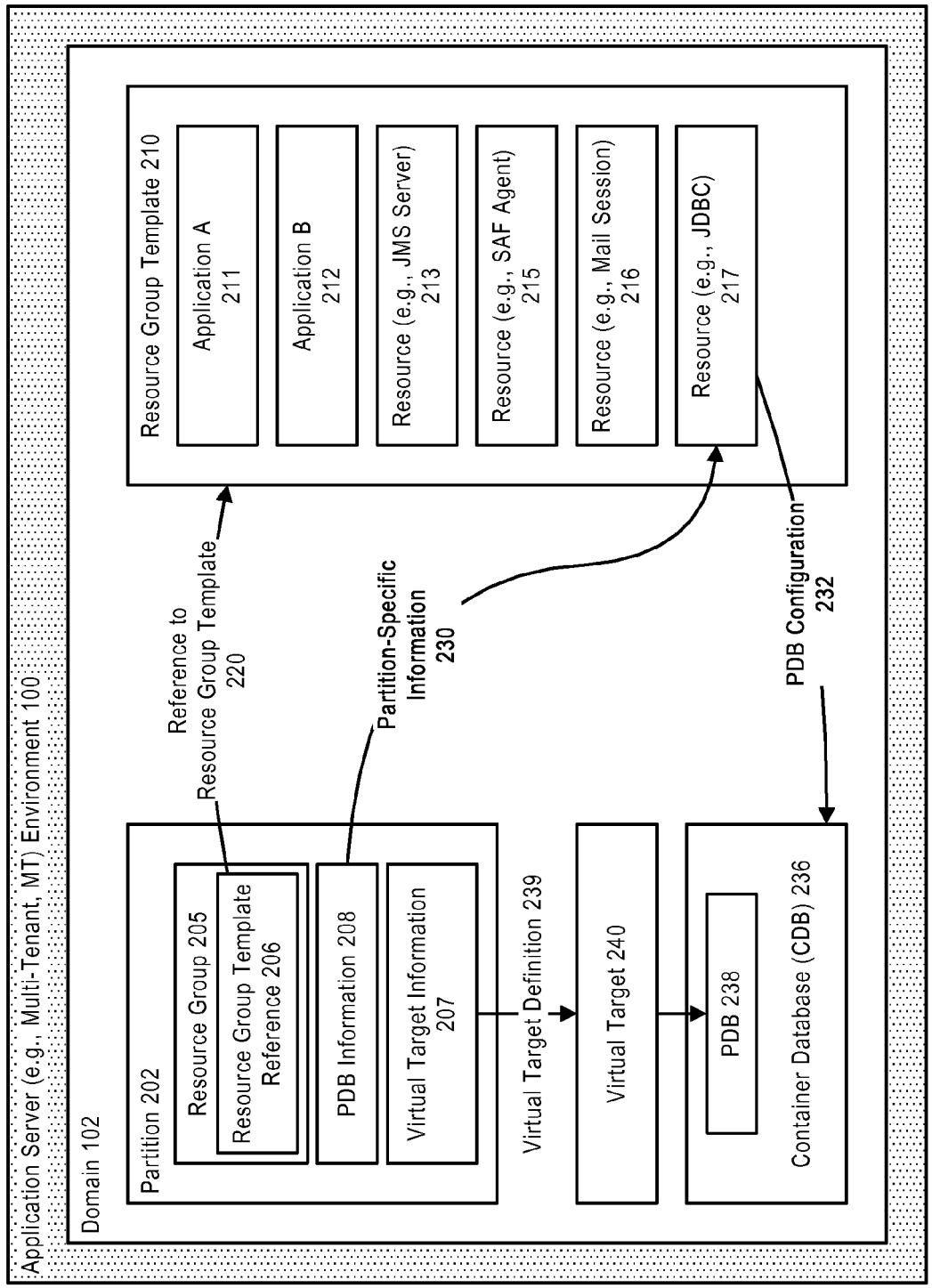
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
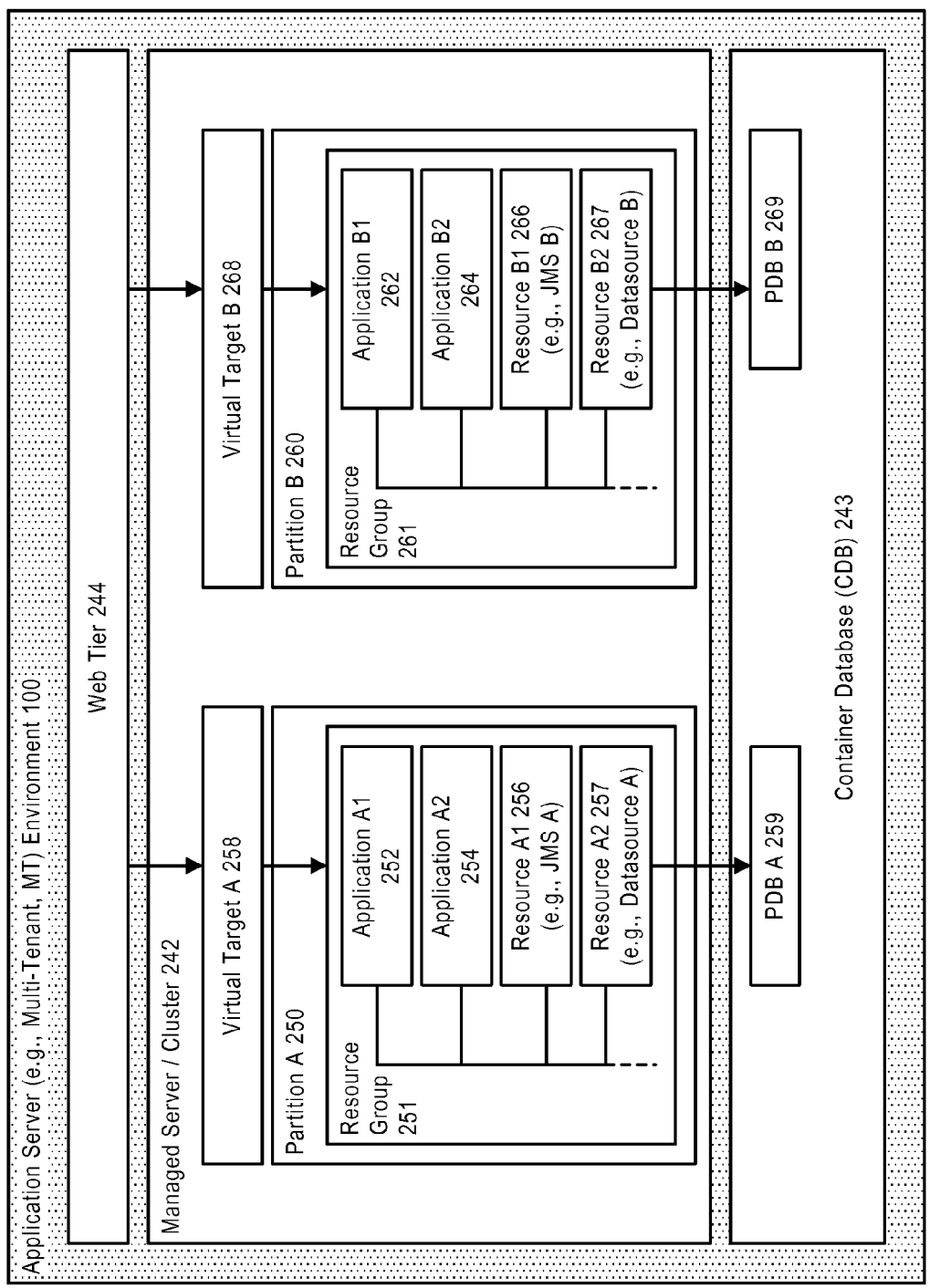
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
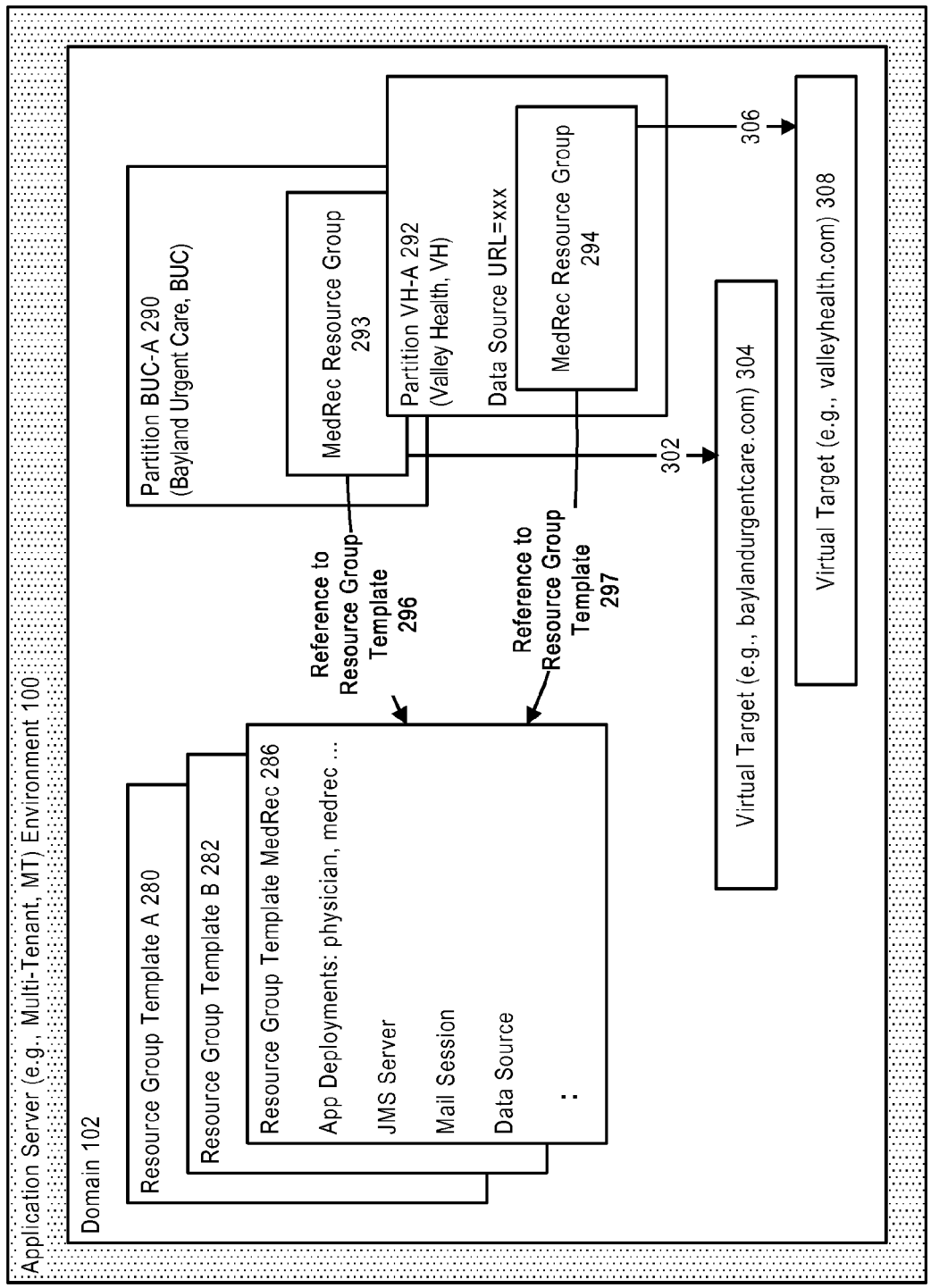
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
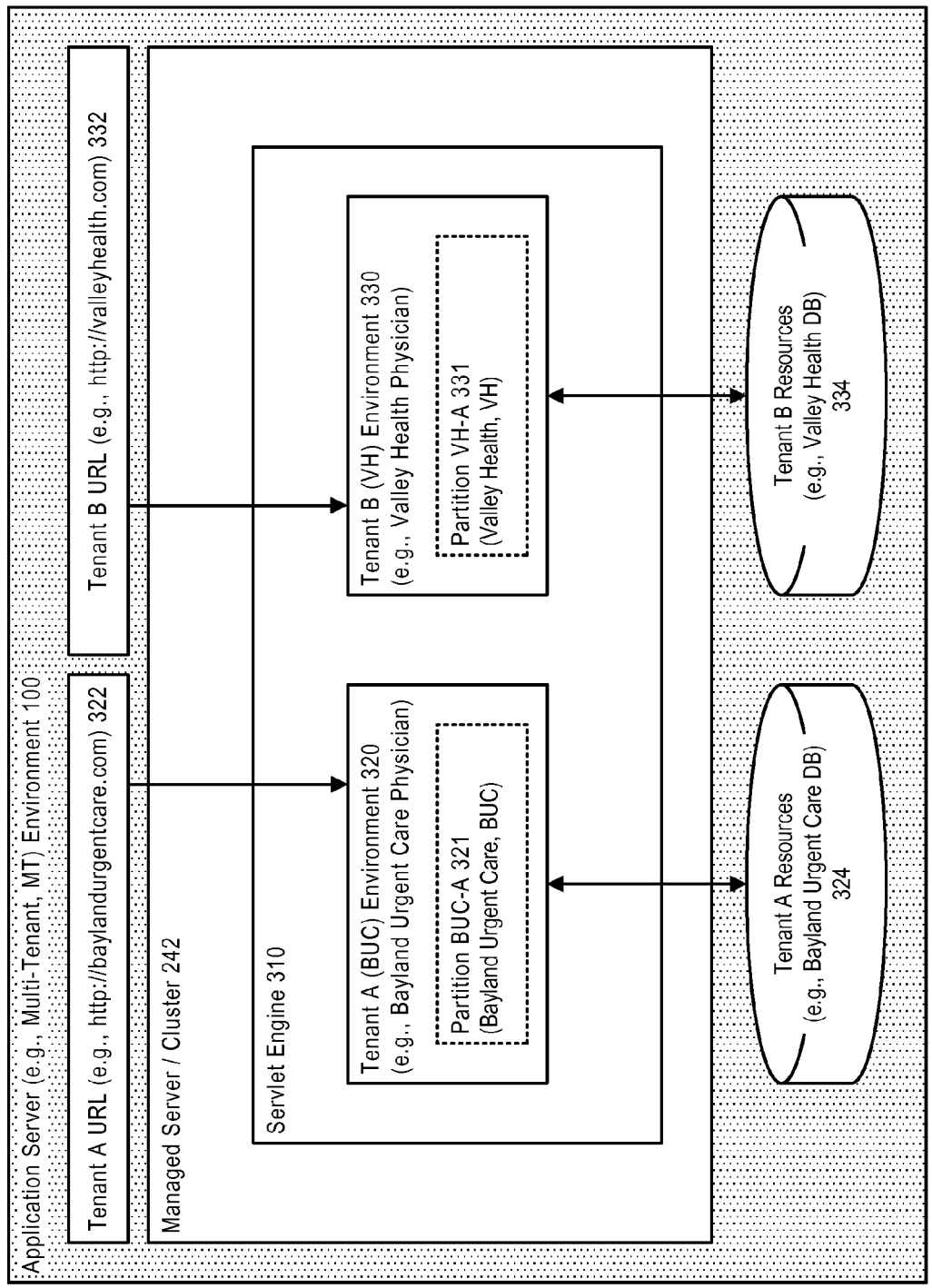
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Configuration Tagging

In accordance with an embodiment, a user interface is provided which displays a domain structure, including partitions and target systems, and enables components of the domain to be associated with user-specified tags that are received from an administrator, including for example, a first component associated with a first set of one or more tag(s), and a second component associated with a second set of one or more tag(s), which are then associated with the corresponding domain component. For example, a virtual target or target system can be associated with a tag such as "Gold", "Silver" or "Bronze". The tagged components can then be associated with the creation or definition of a partition.

In accordance with various embodiments, tagging supports a variety of use cases. For example, tagging can be employed to allow an administrator to, e.g., find fast computer servers or clusters within a computing environment for use as potential targets, or to locate resources which that administrator can use (versus another administrator).

Tagging can also be combined with the use of other system features, for example partition templates, to allow partition template configurators to use tagging to e.g., define "gold" or "bronze" level partition templates.

Figure 6:
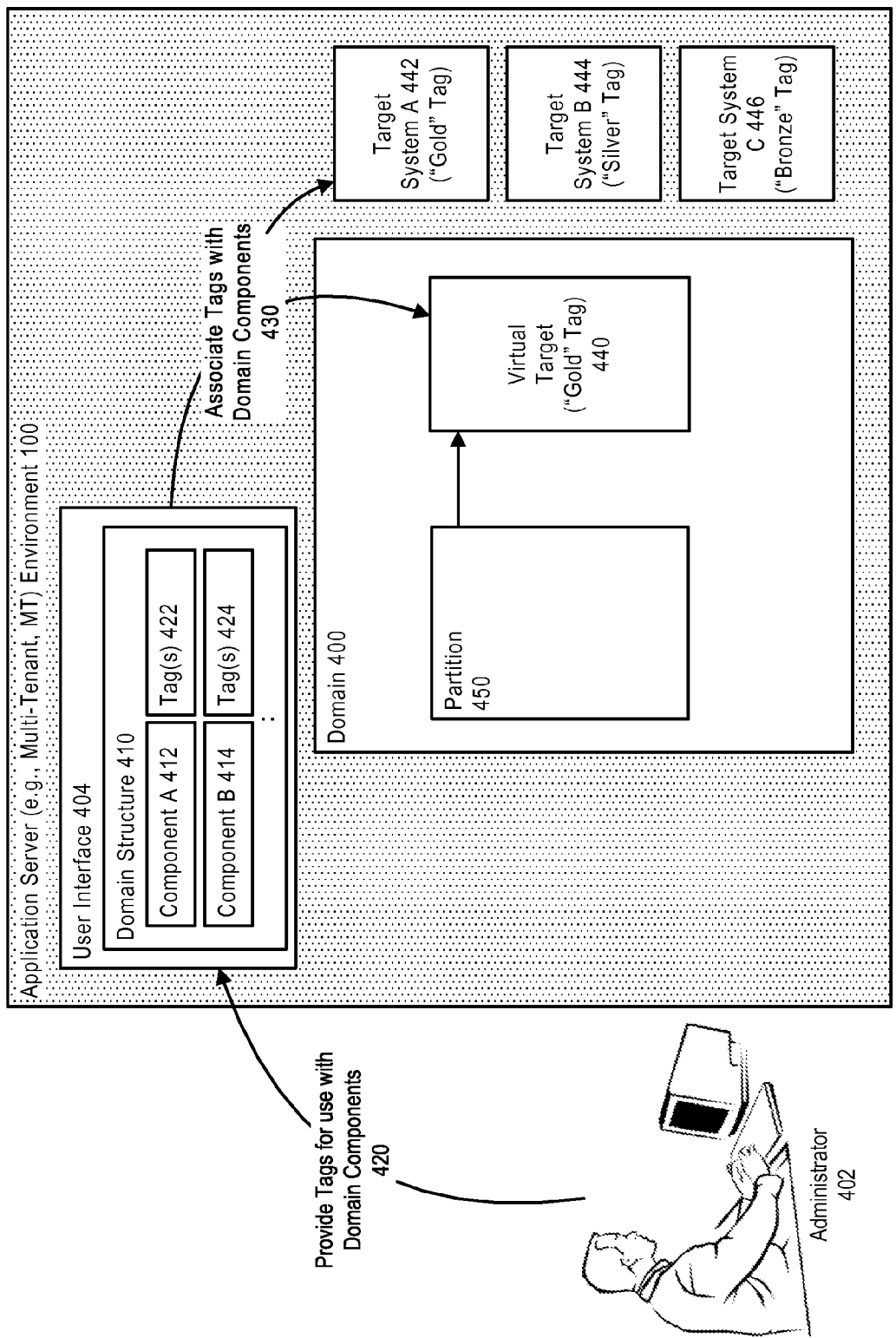
FIG. 6 illustrates the use of configuration tagging in an application server, cloud, or other environment, in accordance with an embodiment.

FIG. 6 illustrates the use of configuration tagging in an application server, cloud, or other environment, in accordance with an embodiment. As shown in FIG. 6, in accordance with an embodiment, a domain 400 is provided for execution of software applications, and one or more partitions and resource groups, wherein each partition provides an administrative and runtime subdivision of the domain.

An administrator 402 may wish to create new partitions for use with the domain. In accordance with an embodiment, a user interface 404 is provided which displays a domain structure 410, including partitions and target systems, and enables components of the domain to be associated with user-specified tags that are received 420 from the administrator, including for example, a first component A 412 associated with a first set of one or more tag(s) 422, and a second component B 414 associated with a second set of one or more tag(s) 424, which are then associated 430 with the corresponding domain component. In accordance with an embodiment, any system configuration MBeans can be associated with tags.

In accordance with an embodiment, an administrator can select a tag to use from a list of available tags, or add a new tag and then use it. Tags need not be explicitly created or deleted, but instead can be simply set and used as desired.

For example, a virtual target 440 can be associated with a tag "Gold", while a target system A 442 can be similarly associated with a tag "Gold"; a target system B 444 with a tag "Silver" and a target system C 446 with a tag "Bronze". The tagged components can then be associated with the creation or definition of a partition 450.

Figure 7:
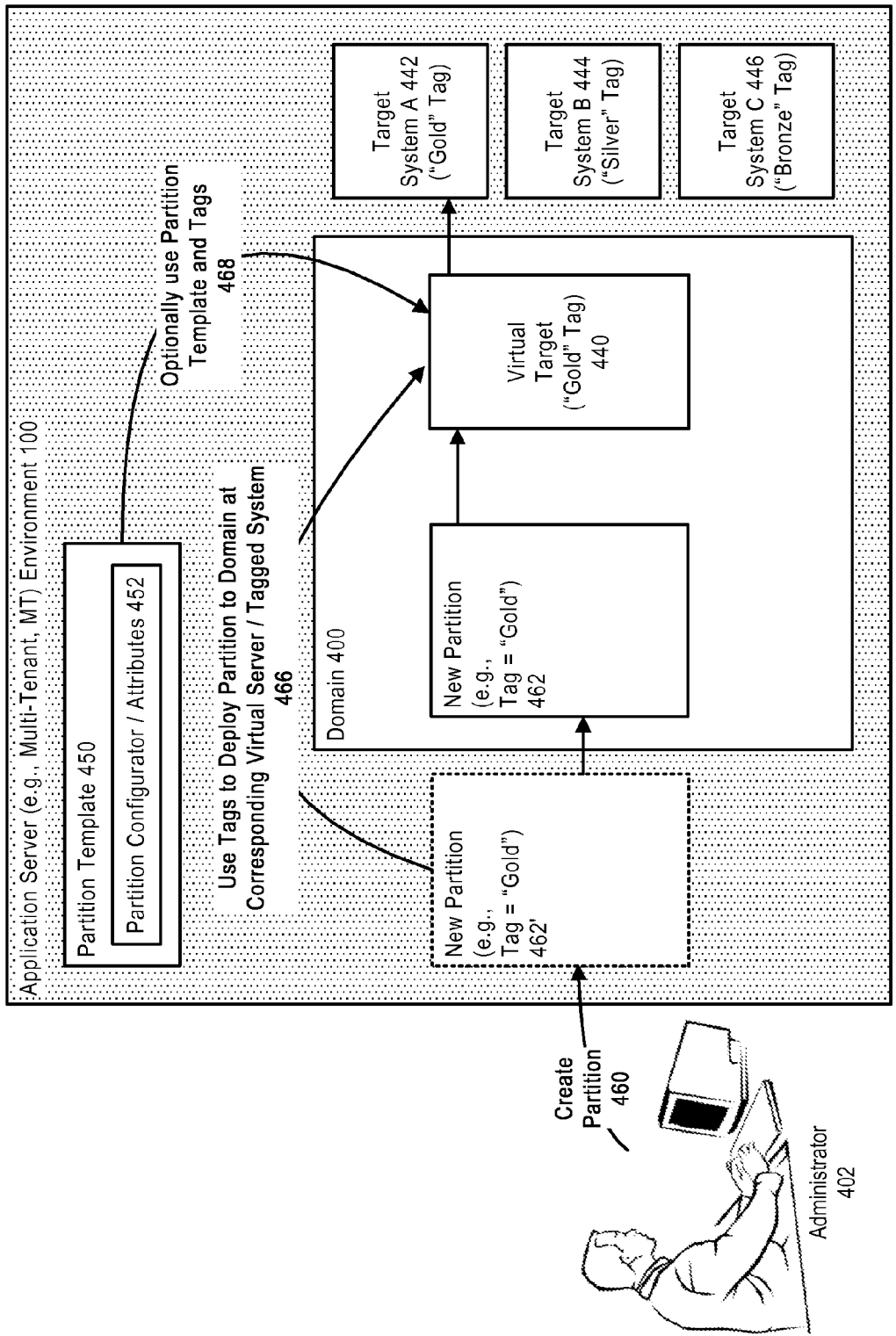
FIG. 7 further illustrates the use of configuration tagging in an application server, cloud, or other environment, in accordance with an embodiment.

FIG. 7 further illustrates the use of configuration tagging in an application server, cloud, or other environment, in accordance with an embodiment. As shown in FIG. 7, in accordance with an embodiment, the tagged components can be associated with the creation or definition of a partition by an administrator, for example a request can be received to create 460 a new partition 462 with a "Gold" tag, which enables the system to deploy 466 the partition to the domain at a tagged "Gold" virtual server, associated with a tagged "Gold" system.

Similarly, when a partition template is used, a selected partition template 450 can be determined, and a partition configurator 452 of that partition template used with the tags to deploy 468 the partition to the domain at the tagged "Gold" virtual server, associated with the tagged "Gold" system.

In accordance with an embodiment, the system can use a Boolean-type, fuzzy/smart, or other type of matching to locate appropriate components associated with specified tags.

Figure 8:
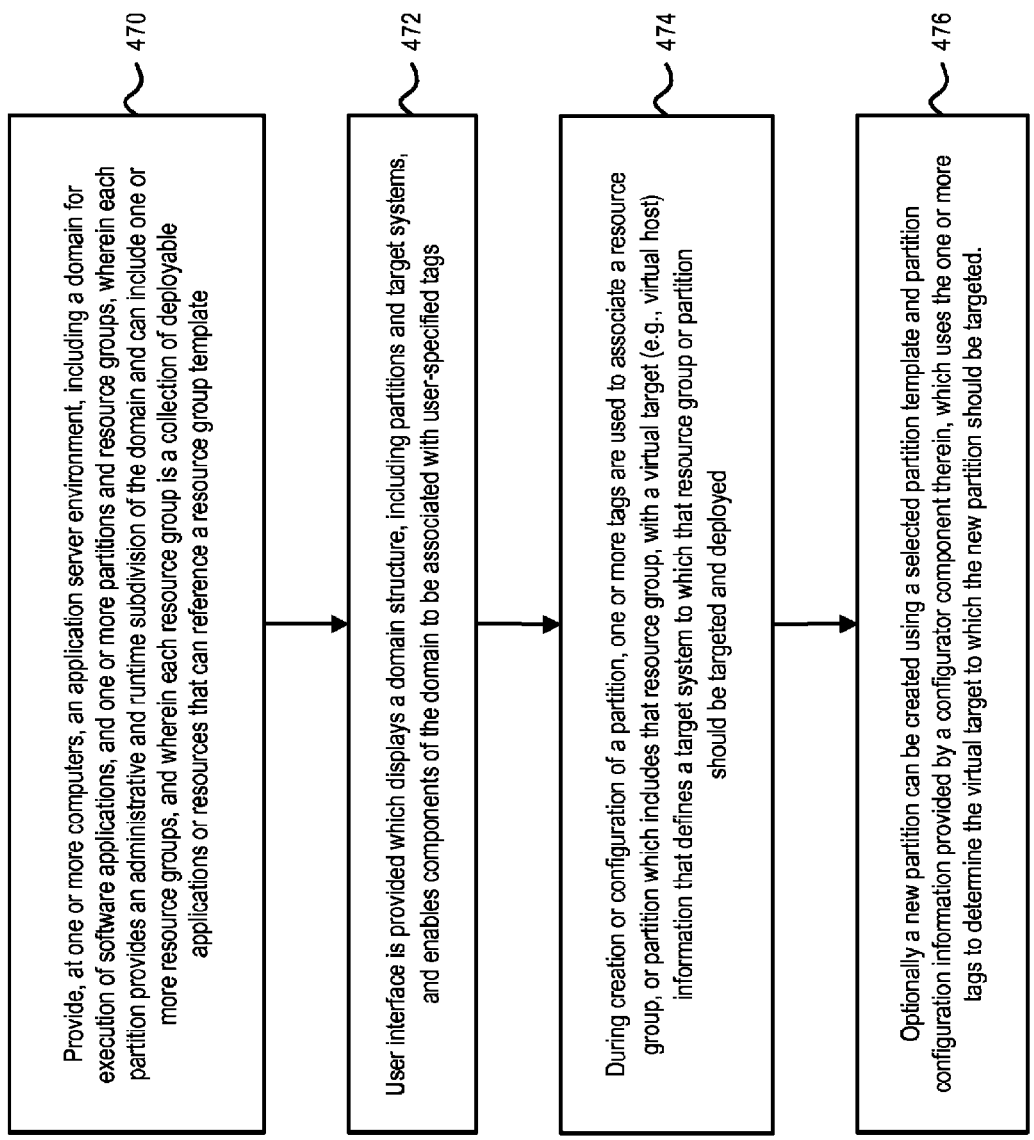
FIG. 8 illustrates a method of configuration tagging in an application server, cloud, or other environment, in accordance with an embodiment.

FIG. 8 illustrates a method of configuration tagging in an application server, cloud, or other environment, in accordance with an embodiment. As shown in FIG. 8, in accordance with an embodiment, at step 470, an application server environment is provided, including a domain for execution of software applications, and one or more partitions and resource groups, wherein each partition provides an administrative and runtime subdivision of the domain and can include one or more resource groups, and wherein each resource group is a collection of deployable applications or resources that can reference a resource group template.

At step 472, a user interface is provided which displays a domain structure, including partitions and target systems, and enables components of the domain to be associated with user-specified tags.

At step 474, during creation or configuration of a partition, one or more tags are used to associate a resource group, or partition which includes that resource group, with a virtual target (e.g., virtual host) information that defines a target system to which that resource group or partition should be targeted and deployed.

At step 476, optionally a new partition can be created using a selected partition template and partition configuration information provided by a configurator component therein, which uses the one or more tags to determine the virtual target to which the new partition should be targeted.

Example Implementation

Additional details describing an exemplary embodiment are provided below for purposes of illustration.

User-Defined Tagging

In accordance with an embodiment, a configuration tag is a user-defined text that is used to describe some configurable component, such as a machine or a cluster, within a domain. Any component may be tagged with any number of tags. The same tag may be used in multiple components. Configuration tagging allows the system administrator to organize components, such as, nodes, clusters, data sources, managed servers, partitions, in a flexible, custom way. Once tagged, a component(s) can be discovered based on a tag(s). Some example use cases for tagging include:

General organization: two different admins can organize the domain corresponding to their own areas of responsibility.

Dynamic clustering: select a machine to add to a cluster based on tags (get me a "fast" machine) instead of just by name.

Dynamic configuration update for partitions: when creating a Partition from a Partition Template dynamically select a "gold" cluster as the partition target.

General configuration: make a configuration change to all "gold" clusters using an administrative command or script (e.g., in a WebLogic environment, WLST).

Quota: tenant can only create 3 partitions from a "gold" Partition Template.

Tag Creation

In accordance with an embodiment, tags will be stored in the config.xml. Tags are not explicitly created or deleted. They are simply set or removed from config beans.

Configuration MBeans

In accordance with an embodiment, all config beans are taggable, which can be enabled by adding getters/setters for tag(s) to the ConfigurationMBean superclass. The role for tags reflect the roles associated with crud for a particular mbean. The roles allowed to change a tag is the same as the roles allowed on a particular MBean. So if a 'deployer' role has permission to change an ApplicationMBean, for example, the 'deployer' can also change the tag.

```
public interface ConfigurationMBean {
/**
* <p>Return all tags on this configuration MBean</p>
* @return all tags on this MBean
* @dynamic true
* @since 12.1.4.0
*/
public String[ ] getTags( );
/**
* <p>Sets the tags on the Configuration MBean, replacing the old set of
* tags with a new set of tags. All tags are removed from the Configuration
* MBean if the tagArray param is an empty String array. Tags may
* contain white spaces.</p>
* @param tagArray tags to be added to the MBean
* @dynamic true
* @since 12.1.4.0
* @throws IllegalArgumentException if the tag contains illegal
punctuation
*/
void setTags(String[ ] tagArray)
throws IllegalArgumentException;
/**
* <p>Add a tag to this Configuration MBean. Adds a tag to the current set
* of tags on the Configuration MBean. Tags may contain white
spaces.</p>
* @param tag tag to be added to the MBean
* @return returns true if successful
* @dynamic true
* @since 12.1.4.0
* @throws IllegalArgumentException if the tag contains illegal
punctuation
*/
boolean addTag(String tag)
throws IllegalArgumentException;
/**
* <p>Remove a tag from this Configuration MBean</p>
* @param tag tag to be removed from the MBean
* @return returns true if successful
* @dynamic true
* @since 12.1.4.0
```

-continued

```
* @throws IllegalArgumentException if the tag contains illegal
punctuation
*/
boolean removeTag(String tag)
throws IllegalArgumentException;
}
```

Tag Queries

In accordance with an embodiment, in order to make use of the tagged config beans, a variety of ways can be supported to search for config beans by tag(s). For example:
Get all tags in a domain (ex. 'high performance', 'gold', 'silver', 'santa clara).
Get all taggable configuration mbean types in a domain (ex. machine, cluster).
Get all tagged configuration mbeans and their tag(s) in a domain (machineA is 'high performance' and 'gold', cluster1 is tagged 'gold' and 'santa clara', cluster2 is tagged 'silver' and 'santa clara').
Get all tags on a configuration mbean (cluster1 is tagged 'gold' and 'santa clara').
Get all tags on all configuration mbeans of type FooMBean (clusters have been tagged 'gold', 'silver', 'santa clara').
Get all configuration beans with a certain tag(s) (Get all components tagged 'gold': machineA and cluster1).
Get all configuration beans of type FooMBean or BarMBean with tag "X" and tag "Y" and tag "Z" (clusters have been tagged 'gold', 'silver', 'santa clara').
Get all config mbeans of type FooMBean or BarMBean with tag "X" or tag "Y" or tag "Z" (clusters have been tagged 'gold', 'silver', 'santa clara').
Get a config bean of type FooMBean with tag "X" ((Get a 'gold' cluster: cluster1).
Get a config bean of type FooMBean with tag "X" and tag "Y" and tag "Z".
Get a config bean of type FooMBean with tag "X" or tag "Y" or tag "Z".
Get all config beans of type TargetMBean with tag "X" or (ServerMBean with tag "Y" but not tag
In accordance with an embodiment, if the user can walk the domain's config tree, the user can get the desired config beans with the desired tags by calling getTags( ) If the user cannot walk the config tree, two convenience methods are available on the DomainMBean to support simple tag queries: 1) findConfigBeansWithTags 2) listTags.

Tag Configuration

In accordance with an embodiment, a tag is a simple string, and there can be 0 to many tag elements under a configuration component. A tag is a localized string, and white space is allowed (allows for more user-friendly tags), for example:

```
<cluster>
  <name>Testing</name>
  <tag>gold</tag>
  <tag>santa clara</tag>
</cluster>
```

Tagging Use-Cases

The following use cases are provided as examples:
General Organization

Two different admins, one from HR and one from Finance, share a single domain. With tagging support, they can tag any of their own resources (JMS, security, JDBC, clusters, etc) with a meaningful tag, such as, 'hr' or 'finance'. From the Admin Console, they could potentially filter their resources by tag so they only view the resources that they care about.

Dynamic Clustering

Dynamic clusters comprise servers that are generated from a server template. Server-specific attributes, such as server name, machine, and listen ports, must be calculated using the information provided when creating the dynamic cluster. The dynamic cluster attributes CalculatedMachineNames and MachineNameMatchExpression control how server instances in a dynamic cluster are assigned to a machine. If the CalculatedMachineNames attribute is set to false, then the dynamic servers will not be assigned to a machine. If the CalculatedMachineNames attribute is set to true, then the MachineNameMatchExpression attribute is used to select the set of machines used for the dynamic servers. Currently, an administrator can choose either 1) MachineNameMatchExpression attribute is not set: All of the machines in the domain are rotated through as servers are generated. 2) MachineNameMatchExpression is set: Only matching machines based on a string expression are rotated through as the servers are generated. (MachineNameMatchExpression: fast*) Assignments are made using a round robin algorithm.

With tagging support, a third option is available for assigning a machine to a dynamic server 3) Only matching machines based on a tag are rotated through as the servers are generated. (Admin has added tag 'fast' to a subset of machines in the domain.)

To allow for tag matching, the attribute MachineNameMatchExpression can be changed to MachineMatchExpression, and a new attribute MachineMatchType added. Using an administrative command or script, one can use these attributes to specify that the dynamic servers should be assigned to a machine that has the tag "fast": dynServers.setMachineMatchType('tag') dynServers.setMachineMatchExpression("fast"). The resulting config.xml file is:

```
<server-template>
  <name>dynamic-cluster-server-template</name>
  <accept-backlog>2000</accept-backlog>
  <auto-restart>true</auto-restart>
  <restart-max>10</restart-max>
  <startup-timeout>600</startup-timeout>
</server-template>
<cluster>
  <name>dynamic-cluster</name>
  <dynamic-servers>
    <server-template>dynamic-cluster-server-template</server-template>
    <maximum-dynamic-server-count>10</maximum-dynamic-server-count>
    <calculated-machine-names>true</calculated-machine-names>
    <machine-match-type>tag</machine-match-type>
    <machine-match-expression>fast</machine-match-expression>
    <server-name-prefix>dynamic-server-</server-name-prefix>
  </dynamic-servers>
</cluster>
<machine>
  <name>machine1</name>
  <tag>slow</tag>
</machine>
<machine>
  <name>machine2</name>
</machine>
<machine>
  <name>machine3</name>
  <tag>fast</tag>
</machine>
```

Configuration

The following examples show how the configuration subsystem can leverage configuration tagging by allowing config beans to be specified based on a tag instead of being explicitly specified.

A. Assign 'Gold' Servers to a Cluster

The administrative command, assign, assigns resources to one or more destinations.

assign(sourceType, sourceName, destinationType, destinationName)

With configuration tagging, this can be used in a more flexible manner using a syntax such as:

assign(sourceType, tagType, tag, sourceNum, destinationType, destinationName)

The following example illustrates the assigning of two servers on "fast" machines to the cluster myCluster (in this example, the administrator has already added the tag, 'fast', to certain servers):

assign("Server", "Machine", "gold", 2, "Cluster", "myCluster")

B. Find all "Gold" Clusters and Update their Configuration.

goldClusters=domain.findConfigBeansWithTags("Cluster", "gold")

Now that we have all the "gold" cluster MBeans, we can, e.g., use an administrative command or script or interactively, to update some configuration for all the "gold" clusters, such as increasing the JDBC connection pool size.

C. Create a cluster with three "gold" servers

The following is an idea of how this might be done:

```
goldServers = domain.findConfigBeansTags("Server", "gold")
cd('Clusters')
goldCluster = cmo.createCluster('goldCluster')
goldServers[0].setCluster('goldCluster')
goldServers[1].setCluster('goldCluster')
goldServers[2].setCluster('goldCluster')
```

D. Create a Cluster with Servers on Machines Tagged 'Fast'

Get three servers assigned to a 'fast' machine and add them to a cluster, for example:

```
servers = domain.getServers( )
cluster = cmo.createCluster('cluster')
if server.getMachine( ).getTag( ) = 'fast'
server.setCluster('cluster')
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting the use of configuration tagging in an application server environment, comprising:
one or more computers, each of the one or more computers including a processor and a memory,
wherein the one or more computers provide an application server environment that enables deployment and execution of software applications, wherein the application server environment includes a domain configuration that is used at runtime to define a domain for execution of the software applications, one or more partitions, and one or more resource groups,
wherein each partition, of the one or more partitions, is associated with a partition identifier and a partition configuration, and provides an administrative and runtime subdivision of the domain, and
wherein each resource group, of the one or more resource groups, is a collection of deployable applications or resources that are defined at one of domain or partition level; and
a user interface that displays a domain structure and enables components of the domain including one or more target systems to be associated with user-specified tags, to indicate tagged domain components for use with the one or more partitions, wherein the tags are stored and queried and a result of the query used as an input to an administrative operation associated with one or more components of the domain;
wherein, during at least one of creation or definition of a particular partition for use with the domain, at least one or more of the tagged domain components are determined and associated with the particular partition, for use with the particular partition.

2. The system of claim 1, wherein the application server environment includes a Java EE application server.

3. The system of claim 1, wherein one or more partition templates are labeled with user-specified tags, so that a partition created from a particular template inherits a copy of the tags from that template, and wherein the partition template and the tags control how partitions are at least one of created or distributed within the application server environment.

4. The system of claim 1, wherein the system is provided within a cloud environment, to support multiple tenants operating within the cloud environment, including that the system associates one or more partitions with a tenant, for use by the tenant.

5. A method for supporting the use of configuration tagging in an application server environment, comprising:
providing, at one or more computers, an application server environment that enables deployment and execution of software applications, wherein the application server environment includes a domain configuration that is used at runtime to define a domain for execution of the software applications, one or more partitions, and one or more resource groups, wherein each partition, of the one or more partitions, is associated with a partition identifier and a partition configuration, and provides an administrative and runtime subdivision of the domain, and wherein each resource group, of the one or more resource groups, is a collection of deployable applications or resources that are defined at one of domain or partition level; and providing a user interface that displays a domain structure and enables components of the domain including one or more target systems to be associated with user-specified tags, to indicate tagged domain components for use with the one or more partitions, wherein the tags are stored and queried and a result of the query used as an input to an administrative operation associated with one or more components of the domain;

wherein, during at least one of creation or definition of a particular partition for use with the domain, at least one or more of the tagged domain components are determined and associated with the particular partition, for use with the particular partition.

6. The method of claim 5, wherein the application server environment includes a Java EE application server.

7. The method of claim 5, wherein one or more partition templates are labeled with user-specified tags, so that a partition created from a particular template inherits a copy of the tags from that template, and wherein the partition template and the tags control how partitions are at least one of created or distributed within the application server environment.

8. The method of claim 5, wherein the method is performed within a cloud environment, to support multiple tenants operating within the cloud environment, including associating one or more partitions with a tenant, for use by the tenant.

9. A non-transitory computer readable storage medium, including instructions stored thereon which when read and executed by one or more computers cause the one or more computers to perform the method comprising:

providing an application server environment that enables deployment and execution of software applications, wherein the application server environment includes a domain configuration that is used at runtime to define a domain for execution of the software applications, one or more partitions, and one or more resource groups, wherein each partition, of the one or more partitions, is associated with a partition identifier and a partition configuration, and provides an administrative and runtime subdivision of the domain, and wherein each resource group, of the one or more resource groups, is a collection of deployable applications or resources that are defined at one of domain or partition level; and providing a user interface that displays a domain structure and enables components of the domain including one or more target systems to be associated with user-specified tags, to indicate tagged domain components for use with the one or more partitions, wherein the tags are stored and queried and a result of the query used as an input to an administrative operation associated with one or more components of the domain;

wherein, during at least one of creation or definition of a particular partition for use with the domain, at least one or more of the tagged domain components are determined and associated with the particular partition, for use with the particular partition.

10. The non-transitory computer readable storage medium of claim 9, wherein the application server environment includes a Java EE application server.

11. The non-transitory computer readable storage medium of claim 9, wherein one or more partition templates are labeled with user-specified tags, so that a partition created from a particular template inherits a copy of the tags from that template, and wherein the partition template and the tags control how partitions are at least one of created or distributed within the application server environment.

12. The non-transitory computer readable storage medium of claim 9, wherein the method is performed within a cloud environment, to support multiple tenants operating within the cloud environment, including associating one or more partitions with a tenant, for use by the tenant.

13. The system of claim 1, wherein a resource group can selectively reference a resource group template, and wherein a partition operates as a binding of deployable resources defined in the resource group template, for use with the partition.

14. The system of claim 1, wherein the system is provided within a cloud environment.

15. The method of claim 5, wherein a resource group can selectively reference a resource group template, and wherein a partition operates as a binding of deployable resources defined in the resource group template, for use with the partition.

16. The method of claim 5, wherein the method is performed within a cloud environment.

17. The non-transitory computer readable storage medium of claim 9, wherein a resource group can selectively reference a resource group template, and wherein a partition operates as a binding of deployable resources defined in the resource group template, for use with the partition.

* * * * *

UNITED STATES PATENT AND TRADEMARK OFFICE
CERTIFICATE OF CORRECTION

PATENT NO. : 9,928,111 B2
APPLICATION NO. : 14/748146
DATED : March 27, 2018
INVENTOR(S) : Dipol et al.

Page 1 of 1

It is certified that error appears in the above-identified patent and that said Letters Patent is hereby corrected as shown below:

In the Specification

In Column 11, Line 15, delete "clara)." and insert -- clara'). --, therefor.

In Column 11, Line 34, delete "((Get" and insert -- (Get --, therefor.

Signed and Sealed this
Twenty-eighth Day of August, 2018

Andrei Iancu
*Director of the United States Patent and Trademark Office*